(12) United States Patent
Kwon et al.

(10) Patent No.: US 9,887,744 B2
(45) Date of Patent: Feb. 6, 2018

(54) MIMO TRANSMISSION METHOD AND MIMO TRANSMISSION DEVICE USING PLURALITY OF CELLS IN MULTI-CELL WIRELESS COMMUNICATION SYSTEM

(71) Applicant: Samsung Electronics Co., Ltd, Gyeonggi-do (KR)

(72) Inventors: Ho-Joong Kwon, Gyeonggi-do (KR); Eun-Yong Kim, Gyeonggi-do (KR); June Moon, Gyeonggi-do (KR); Keon-Wook Lee, Gyeonggi-do (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 14/653,767

(22) PCT Filed: Dec. 18, 2013

(86) PCT No.: PCT/KR2013/011800
§ 371 (c)(1),
(2) Date: Jun. 18, 2015

(87) PCT Pub. No.: WO2014/098467
PCT Pub. Date: Jun. 26, 2014

(65) Prior Publication Data
US 2015/0326295 A1    Nov. 12, 2015

(30) Foreign Application Priority Data
Dec. 18, 2012 (KR) .......................... 10-2012-0148937

(51) Int. Cl.
*H04B 7/04* (2017.01)
*H04B 7/024* (2017.01)
(Continued)

(52) U.S. Cl.
CPC ............ *H04B 7/024* (2013.01); *H04B 7/0486* (2013.01); *H04B 7/0495* (2013.01); *H04L 25/03343* (2013.01); *H04L 25/03891* (2013.01)

(58) Field of Classification Search
CPC ... H04B 1/38; H04B 7/00; H04B 7/02; H04B 7/024; H04B 7/04; H04B 7/0486;
(Continued)

(56) References Cited

U.S. PATENT DOCUMENTS

2009/0274227 A1* 11/2009 Kim .................... H04B 7/0619
                                                               375/260
2010/0002607 A1   1/2010 Kim et al.
(Continued)

FOREIGN PATENT DOCUMENTS

KR   10-2008-0069174    7/2008
KR   10-2010-0005650    1/2010
(Continued)

OTHER PUBLICATIONS

International Search Report dated Feb. 21, 2014 in connection with International Patent Application No. PCT/KR2013/011800, 5 pages.

*Primary Examiner* — Shawkat M Ali

(57) ABSTRACT

The present invention relates to a method by which a base station performs multiple input and multiple output (MIMO) transmission using antennas of a plurality of cells in a multi-cell wireless communication system, the method comprising the steps of: selecting a rank value and cells for downlink MIMO transmission of a terminal on the basis of measurement information of the base station and the terminal, and determining a precoding matrix according to the rank value; and generating data which is to be transmitted to the terminal as data streams corresponding to the selected
(Continued)

rank value, and mapping the data streams to antennas of the selected cells through a precoder so as to transmit the data streams to the terminal.

12 Claims, 8 Drawing Sheets

(51) Int. Cl.
  *H04B 7/0495* (2017.01)
  *H04L 25/03* (2006.01)
(58) Field of Classification Search
  CPC .......... H04B 7/06; H04B 7/216; H04B 17/00;
      H04J 3/00; H04K 1/10; H04L 1/02;
      H04L 1/18; H04L 5/00; H04L 12/26;
      H04L 12/28; H04W 4/00; H04W 24/10;
      H04W 28/00; H04W 28/16; H04W 36/00;
      H04W 72/00; H04W 72/042; H04W 72/0406
  USPC ........ 370/252, 280, 329, 331, 342; 375/260, 375/267, 295, 316, 342, 347
  See application file for complete search history.

(56) References Cited

U.S. PATENT DOCUMENTS

| | | | |
|---|---|---|---|
| 2010/0329222 | A1 | 12/2010 | Halolbjorner et al. |
| 2011/0064051 | A1* | 3/2011 | Clerckx .................. H04B 7/022 370/331 |
| 2011/0149765 | A1 | 6/2011 | Gorokhov et al. |
| 2011/0194632 | A1* | 8/2011 | Clerckx .................. H04B 7/024 375/260 |
| 2011/0200132 | A1* | 8/2011 | Kim ....................... H04B 7/0413 375/267 |
| 2012/0236725 | A1 | 9/2012 | Gannholm et al. |
| 2012/0289275 | A1 | 11/2012 | Li et al. |
| 2013/0129008 | A1* | 5/2013 | Ko ........................ H04B 7/0473 375/295 |
| 2013/0315189 | A1* | 11/2013 | Kim ....................... H04L 1/0026 370/329 |
| 2014/0226612 | A1* | 8/2014 | Kim ....................... H04B 7/024 370/329 |

FOREIGN PATENT DOCUMENTS

| | | |
|---|---|---|
| KR | 10-2010-0007677 | 1/2010 |
| KR | 10-2012-0033342 | 4/2012 |

* cited by examiner

MIMO TRANSMISSION METHOD AND MIMO TRANSMISSION DEVICE USING PLURALITY OF CELLS IN MULTI-CELL WIRELESS COMMUNICATION SYSTEM

CROSS-REFERENCE TO RELATED APPLICATION(S)

The present application claims priority under 35 U.S.C. § 365 to International Patent Application No. PCT/KR2013/011800 filed Dec. 18, 2013, entitled "MIMO TRANSMISSION METHOD AND MIMO TRANSMISSION DEVICE USING PLURALITY OF CELLS IN MULTI-CELL WIRELESS COMMUNICATION SYSTEM", and, through International Patent Application No. PCT/KR2013/011800, to Korean Application No. 10-2012-0148937 filed Dec. 18, 2012, each of which are incorporated herein by reference into the present disclosure as if fully set forth herein.

DETAILED DESCRIPTION OF THE INVENTION

Technical Field

The present invention relates to a method and apparatus for downlink Multiple Input Multiple Output (MIMO) transmission using antennas of a plurality of cells in a multi-cell wireless communication system.

Background Art

In a multi-cell wireless communication system including a plurality of cells, each cell transmits independent data signals to different terminals using its own antenna. In order to apply a Multiple Input Multiple Output (MIMO) transmission mode for simultaneously transmitting a plurality of pieces of data to a terminal in a cell, at least two antennas should be installed in the cell. Accordingly, only cells with antennas corresponding to a minimal number of antennas required for MIMO transmission can perform MIMO transmission. Also, when a cell with the corresponding number of antennas performs MIMO transmission, a total number of data streams that can be simultaneously transmitted to a terminal is limited by the number of antennas included in the cell.

DISCLOSURE

Technical Problem

The present disclosure relates to a method and apparatus for supporting downlink Multiple Input Multiple Output (MIMO) transmission to a specific terminal using antennas of a plurality of cells in a multi-cell wireless communication system.

Technical Solution

In accordance with an aspect of exemplary embodiments of the present invention, there is provided a method by which a base station performs multiple input and multiple output (MIMO) transmission using antennas of a plurality of cells in a multi-cell wireless communication system, the method including: selecting a rank value and cells for downlink MIMO transmission to a terminal on the basis of measurement information of the base station and the terminal, and determining a precoding matrix according to the rank value; and generating data which is to be transmitted to the terminal as data streams corresponding to the selected rank value, and mapping the data streams to antennas of the selected cells through the precoding matrix so as to transmit the data streams to the terminal.

In accordance with another aspect of exemplary embodiments of the present invention, there is provided a method by which a terminal performs multiple input and multiple output (MIMO) reception using antennas of a plurality of cells in a multi-cell wireless communication system, the method including: generating measurement information based on reference signals received from cells constituting a service coverage of a base station; transmitting the measurement information and a sounding signal to the base station; and simultaneously receiving data streams transmitted through cells selected from among the cells constituting the service coverage of the base station based on the measurement information and information acquired by the cells receiving the sounding signal.

In accordance with another aspect of exemplary embodiments of the present invention, there is provided a base station which performs multiple input and multiple output (MIMO) transmission using antennas of a plurality of cells in a multi-cell wireless communication system, the base station including: a controller configured to select a rank value and cells for downlink MIMO transmission to a terminal on the basis of measurement information of the base station and the terminal, to determine a precoding matrix according to the rank value, to generate data which is to be transmitted to the terminal as data streams corresponding to the selected rank value, and then to map the data streams to antennas of the selected cells through the precoding matrix so as to control a transmitter to transmit the data streams to the terminal.

In accordance with another aspect of exemplary embodiments of the present invention, there is provided a terminal which performs multiple input and multiple output (MIMO) reception using antennas of a plurality of cells in a multi-cell wireless communication system, the terminal including: a controller configured to generate measurement information based on reference signals received from cells constituting a service coverage of a base station, and a transceiver configured to transmit the measurement information and a sounding signal to the base station, and to simultaneously receive data streams transmitted through cells selected from among the cells constituting the service coverage of the base station based on the measurement information and information acquired by the cells receiving the sounding signal.

BEST MODE

Now, the above and other aspects of the present invention will be described in detail through preferred embodiments with reference to the accompanying drawings. In the following description of the present invention, a detailed description of known functions and configurations incorporated herein will be omitted when it may obscure the subject matter of the present invention.

Hereinafter, a method and apparatus that support downlink Multiple Input Multiple Output (MIMO) transmission to a specific terminal using antennas of a plurality of cells, according to embodiments of the present disclosure, will be described.

Generally, cells configuring a network may be assigned unique cell identifiers, and some of the cells may be assigned the same cell identifier. And, a plurality of cells participating in performing downlink MIMO transmission to a terminal may have the same cell identifier or different cell identifiers. In the following description, for convenience of description, a method of supporting downlink MIMO transmission to a terminal using cells having the same cell identifier will be described. For example, it is assumed that a service coverage of a base station is divided into three sectors, and each sector operates as a cell. In this case, downlink MIMO transmission to a terminal is performed using antennas of the sectors. Each sector may include at least one antenna, and the sectors may include the same number of antennas or different numbers of antennas. In the following description, for convenience of description, the sectors will be referred to as cells. Also, in the following description, for convenience of description, it is assumed that a plurality of cells having the same cell identifier include the same number of antennas. Also, a method of supporting downlink MIMO transmission to a terminal using antennas of a plurality of cells, according to the present disclosure, can be supported through cells having different cell identifiers.

Figure 1:
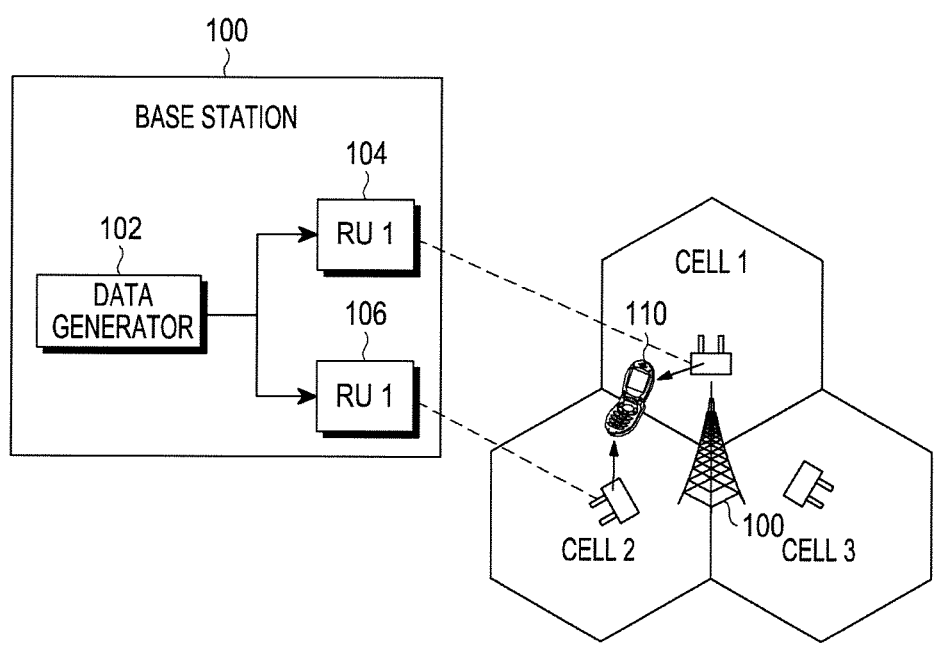
FIG. 1 is a view for describing an example of Multiple Input Multiple Output (MIMO) transmission that is performed on a terminal located at a cell boundary using two cells, according to an embodiment of the present disclosure.

FIG. 1 is a view for describing an example of MIMO transmission that is performed on a terminal located at a cell boundary using two cells, according to an embodiment of the present disclosure.

Referring to FIG. 1, it is assumed that a base station 100 manages three cells, that is, a first cell, a second cell, and a third cell, wherein the first cell includes $n_1$ antennas, and the second cell includes $n_2$ antennas. In the example of FIG. 1, $n_1$ and $n_2$ are assumed to be two.

Also, a terminal 110 may be located at a boundary area between the first cell and the second cell. In this case, the base station 100 may decide to transmit data to the terminal 110 using all the antennas included in the first cell and the second cell. Then, a data generator 102 may generate data that is to be transmitted to the terminal 110, as data streams corresponding to $n_1+n_2$ (that is, 4) that is the total number of the antennas included in the first cell and the second cell. Thereafter, the data generator 102 may map the data streams to a first radio unit (RU1) 104 connected to the first cell and a second radio unit (RU2) 106 connected to the second cell, respectively. Then, the RU1 104 and the RU2 106 may transmit the mapped data streams to the terminal 110 through the antennas included in the first and second cells. As a result, the base station 100 can simultaneously transmit a maximum of $n_1+n_2$ data streams to the terminal 110.

Figure 2A:
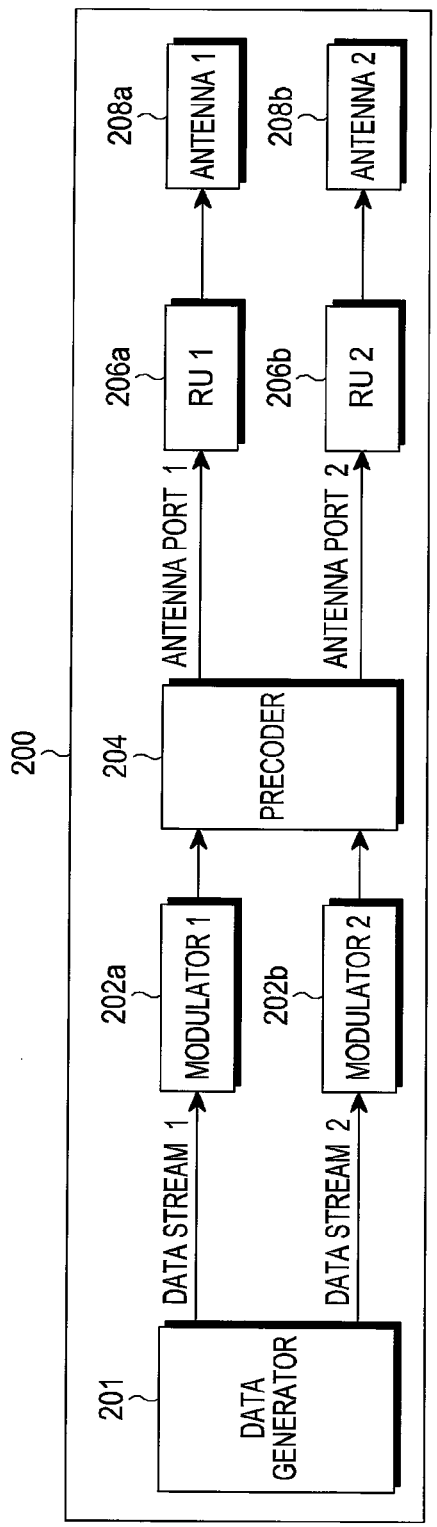
FIG. 2A shows an example of a configuration diagram of a base station for MIMO transmission according to an embodiment of the present disclosure.

FIG. 2A shows an example of a configuration diagram of a base station for MIMO transmission according to an embodiment of the present disclosure.

Referring to FIG. 2A, it is assumed that a base station 200 manages a plurality of cells including a first cell and a second cell, wherein the first cell includes a first antenna 208a and the second cell includes a second antenna 208b. Also, it is assumed that when there is generated data that is to be transmitted to a terminal located at a boundary area between the first cell and the second cell, the base station 200 performs MIMO transmission of the data to the terminal using the first and second antennas 208a and 208b of the first and second cells. In this case, a data generator 201 may generate the data as first and second data streams corresponding to a total number (that is, 2) of the first and second antennas 208a and 208b included in the first and second cells. Then, the data generator 201 may transfer the first data stream and the second data stream to a first modulator 202a and a second modulator 202b, respectively. Then, the first modulator 202a and the second modulator 202b may modulate the first data stream and the second data stream, respectively, and transfer the modulated first and second data streams to a precoder 204. The precoder 204 may perform precoding on the modulated first and second data streams, map the precoded first and second data streams to a first antenna port connected to the first antenna 208a of the first cell and a second antenna port connected to the second antenna 208b of the second cell, respectively, and then output the precoded first and second data streams to a RU1 206a and a RU2 206b, respectively. The RU1 206a and the RU2 206b may transmit signals output mapped to the first and second data streams to the first antenna port and the second antenna port, to the first antenna 208a of the first cell and the second antenna 208b of the second cell so as to transmit the data steams to the terminal.

Figure 2B:
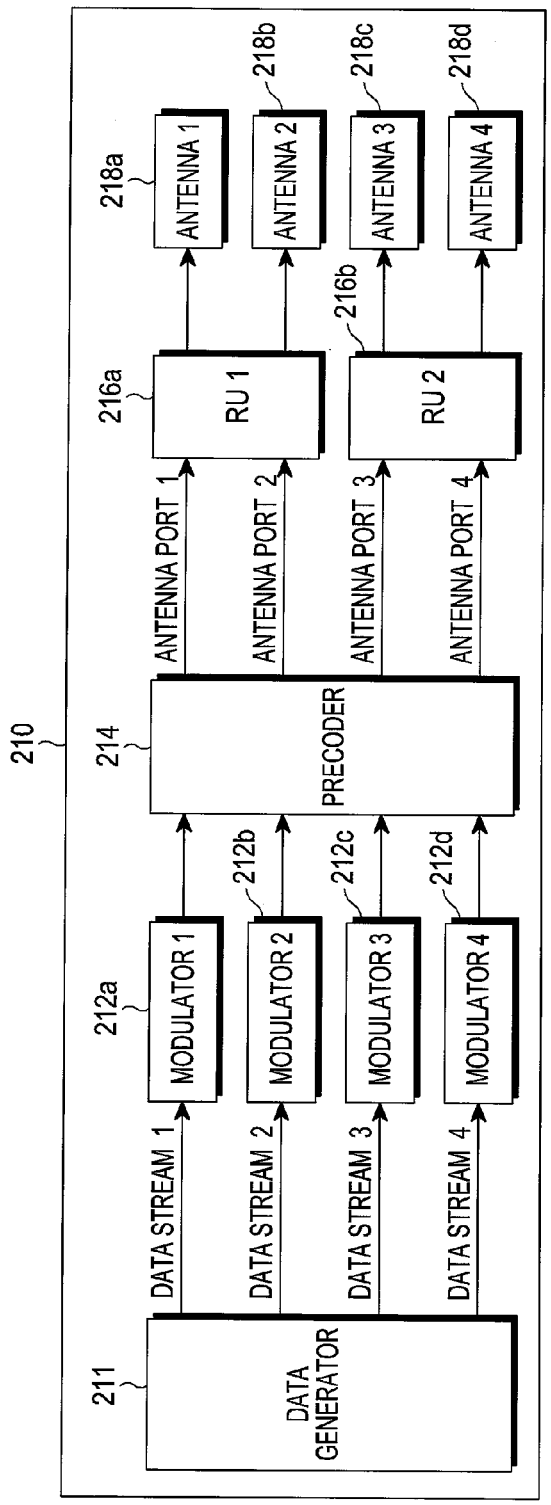
FIG. 2B shows another example of a configuration diagram of a base station for MIMO transmission according to an embodiment of the present disclosure.

FIG. 2B shows another example of a configuration diagram of a base station for MIMO transmission according to an embodiment of the present disclosure.

Referring to FIG. 2B, it is assumed that a base station 210 manages a plurality of cells including a first cell and a second cell, and each of the first and second cells includes two antennas. More specifically, it is assumed that the first cell includes a first antenna 218a and a second antenna 218b, and the second cell includes a third antenna 218c and a fourth antenna 218d. Also, it is assumed that when there is generated data that is to be transmitted to a terminal located at a boundary area between the first cell and the second cell, the base station 210 performs MIMO transmission of the data to the terminal using the antennas 218a to 218d of the first and second cells. In this case, a data generator 211 may generate the data as first to fourth data streams corresponding to a total number (that is, 4) of the antennas 218a to 218d included in the first and second cells. Thereafter, the data generator 211 may transfer the first to fourth data streams to first to fourth modulators 212a to 212d, respectively. The first to fourth modulators 212a to 212d may modulate the first to fourth data streams, respectively, and then transfer the modulated first to fourth data streams to the precoder 214. The precoder 214 may perform precoding on the modulated first to fourth data streams, map the precoded first to fourth data streams to first to fourth antenna ports respectively connected to the first to fourth antennas 218a to 218d included in the first and second cells, and then output the first to fourth data streams to a RU1 216a and a RU2 216b. Then, the RU1 216*a* may transmit signals (the first, and second data streams mapped to the first and second antenna ports) output to the first antenna port to the first and second antennas 218*a* and 218*b* of the first cell, respectively, so as to transmit the first and second data streams to the terminal. Likewise, the RU2 216*b* may transmit signals (the third and fourth data streams mapped to the third and fourth antenna ports) output to the second antenna port to the third and fourth antennas 218*c* and 218*d* of the second cell, respectively, so as to transmit the third and fourth data streams to the terminal.

Figure 3:
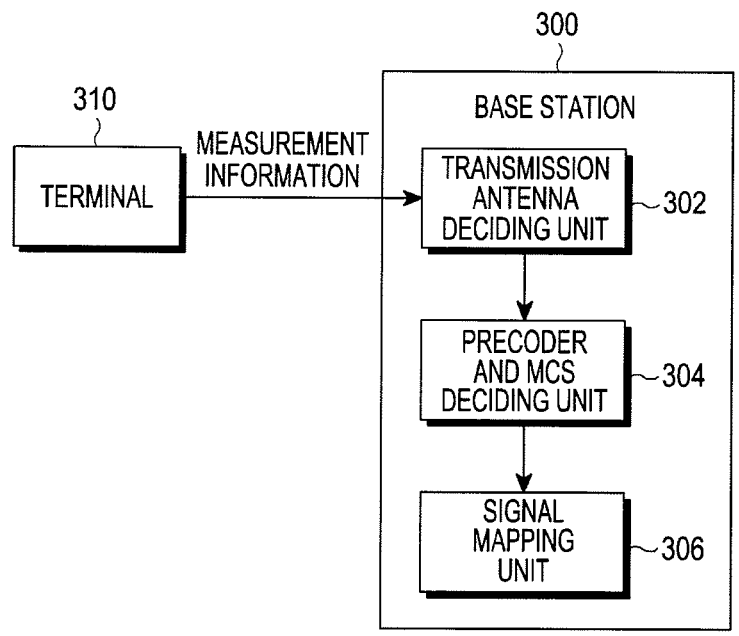
FIG. 3 shows still another example of a configuration diagram of a base station that supports MIMO transmission according to an embodiment of the present disclosure.

FIG. 3 shows still another example of a configuration diagram of a base station that supports MIMO transmission according to an embodiment of the present disclosure.

Referring to FIG. 3, a base station 300 may include a transmission antenna deciding unit 302, a precoder and Modulation and Coding Scheme (MCS) deciding unit 304, and a signal mapping unit 306. Although not shown in FIGS. 1, 2A, and 2B, the components constituting the base station 300 may be included as a controller in the base stations 100, 200, and 210 of FIGS. 1, 2A, and 2B. Also, the base stations 100, 200, and 210 of FIGS. 1, 2A, and 2B may operate according to control information decided by such a controller.

Meanwhile, the components included in the base station 300 are divided according to their functions for convenience of description, however, the transmission antenna deciding unit 302, the precoder and MCS deciding unit 304, and the signal mapping unit 306 constituting the base station 300 may be configured as one unit, or each divided into at least two sub units.

It is assumed that the base station 300 decides to support downlink MIMO transmission to a specific terminal, for example, a terminal 310. Then, the transmission antenna deciding unit 302 may receive measurement information of the terminal 310 from the terminal 310. Herein, the measurement information of the terminal 310 may include at least one of a maximum number of streams that can be received by the terminal 310, channel state information created by the terminal 310 based on a reference signal received from the base station 300, an amount of data that is to be transmitted to the terminal 310, and Quality of Service (QoS) required by the terminal 310. Also, the transmission antenna deciding unit 302 may use measurement information measured by the base station 300. Herein, the measurement information may include information acquired by receiving a sounding signal transmitted from the terminal 310. Also, if the base station 300 manages its own cell coverage in units of cells corresponding to a plurality of sectors, as shown in FIGS. 1, 2A, and 2B, the measurement information may include information acquired by receiving a sounding signal of the terminal 310 for each cell. Also, the measurement information of the terminal 310 and the base station 300 may include information of all terminals located within a service coverage of the base station 300 and information of all terminals located in the adjacent cells, as well as information of the terminal 310.

Also, the transmission antenna deciding unit 302 may decide a group of antennas which support MIMO transmission to the terminal 310, that is, which is used to transmit downlink data to the terminal 310, based on the measurement information of the terminal 310 and the base station 300. At this time, the transmission antenna deciding unit 302 may decide, as the group of antennas, an antenna group including antennas of a cell or antennas of a plurality of cells. Also, a total number of antennas included in the antenna group means a maximum number of data streams that can be simultaneously transmitted to the terminal 310.

The precoder and MCS deciding unit 304 may decide a total number of antennas included in the antenna group decided by the transmission antenna deciding unit 302, as a maximum value. Also, the precoder and MCS deciding unit 304 may decide a number (that is, a rank value) of downlink data streams that are to be actually transmitted to the terminal 310, such that the rank value is smaller than or equal to the maximum value. Also, the precoder and MCS deciding unit 304 may select a precoding matrix that is used for transmission from a precoder group configured with precoding matrices corresponding to the decided rank value. Then, the precoder and MCS deciding unit 304 may decide a MCS for each of the data streams that are actually transmitted to the terminal 310. More specifically, the precoder and MCS deciding unit 304 may use channel state information received from the terminal 310, information acquired from a sounding signal of the terminal 310, previous transmission success/failure information (ACK/NACK) related to downlink data transmission with respect to the terminal 310, etc., to select the precoder and the MCS. Operation of selecting the precoding matrix will be described in more detail, later.

If there is generated data that is to be transmitted to the terminal 310, the signal mapping unit 306 may generate the data as data streams corresponding to the rank value decided by the precoder and MCS deciding unit 304. Then, the signal mapping unit 306 may map the data streams to the transmission antennas decided by the antenna deciding unit 302, and enable the data streams to be simultaneously transmitted to the terminal 310 through the transmission antennas. The base station 100 of FIG. 1 and the base stations 200 and 210 of FIGS. 2A and 2B, as described above, may also substantially perform operations for MIMO transmission according to instructions from the signal mapping unit 306.

Figure 4:
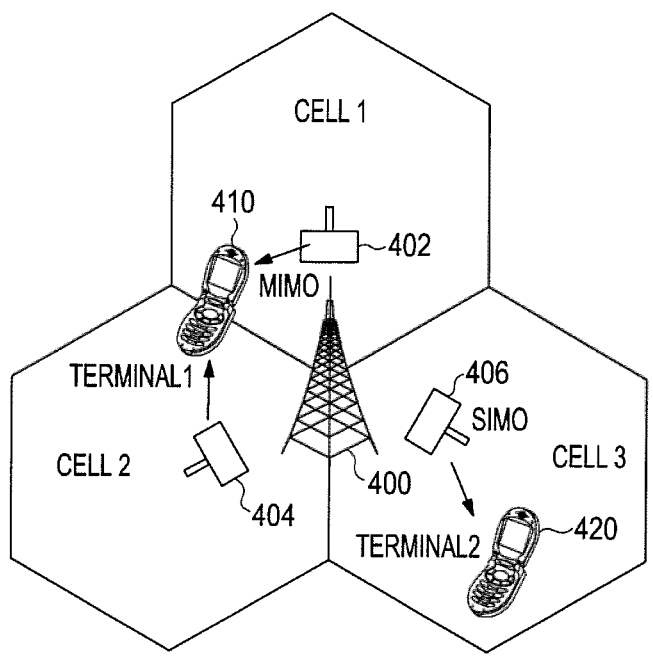
FIG. 4 is a view for describing another example of MIMO transmission according to an embodiment of the present disclosure.

FIG. 4 is a view for describing another example of MIMO transmission according to an embodiment of the present disclosure. Referring to FIG. 4, it is assumed that a base station 400 manages its own service coverage in units of three sectors, that is, first, second, and third cells, wherein the first, second, and third cells have the same cell identifier, and each of the first, second, and third cells includes an antenna. Accordingly, the first, second, and third cells may transmit four Common Reference Signals (CRSs).

Referring to FIG. 4, a first terminal 410 located at a boundary area between the first cell and the second cell may perform MIMO transmission using both the antennas of the first and second cells. That is, it is assumed that the base station 400 decides to perform MIMO transmission of rank 2 to simultaneously transmit two pieces of downlink data to the first terminal 410 through the antennas of the first and second cells using measurement information of the base station 400 and the first terminal 410. Also, it is assumed that the first terminal 410 includes two reception antennas or more. Also, it is assumed that the base station 400 decides to perform Single Input Multiple Output (SIMO) transmission with respect to a second terminal 420 located in the center area of the third cell using an antenna installed in the third cell.

The base station 400 can support MIMO transmission with respect to downlink data of the first terminal 410 although each of cells managed by the base station 400 includes an antenna.

Figure 5:
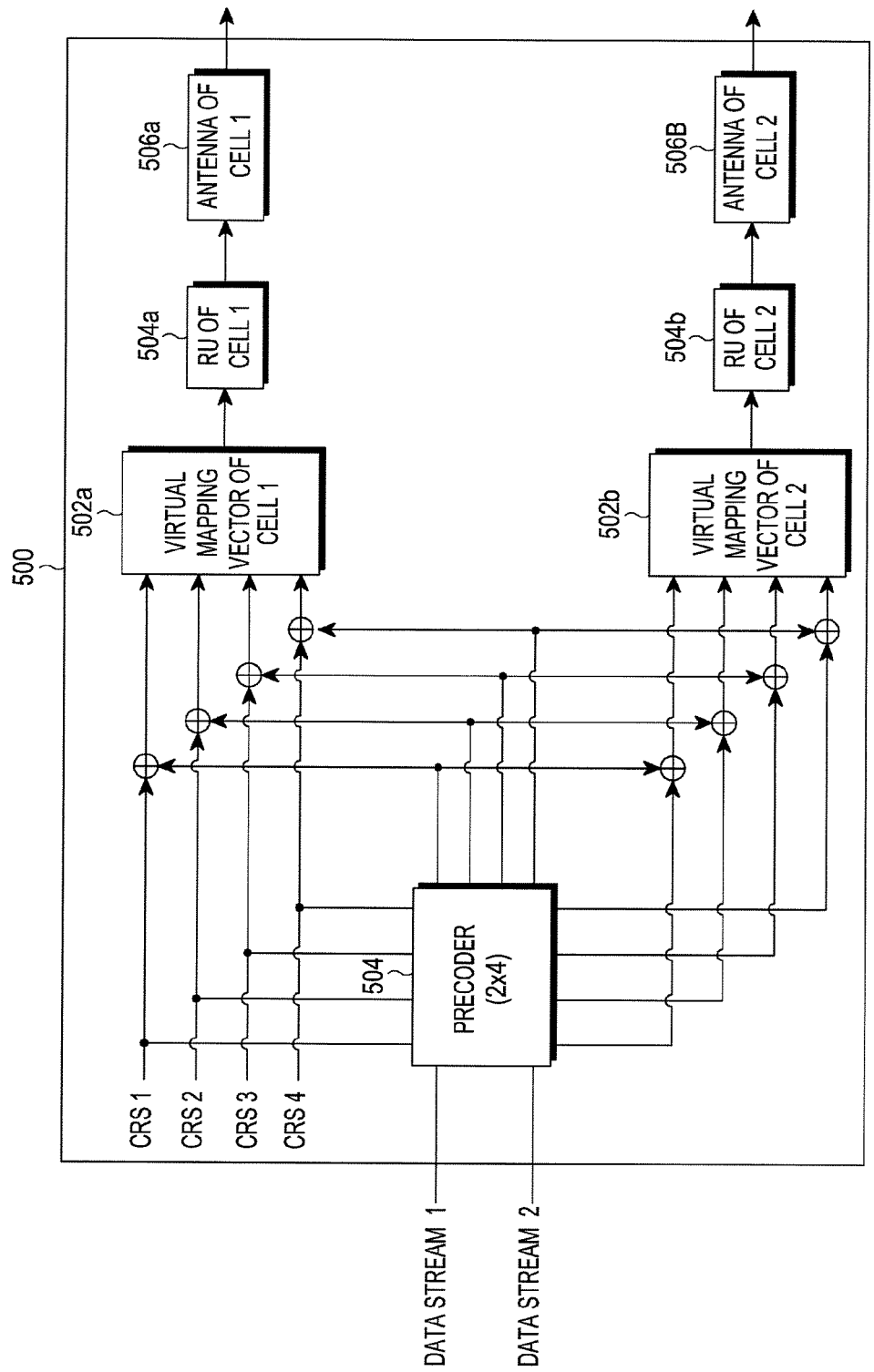
FIG. 5 shows an example of a signal flow diagram of MIMO transmission according to an embodiment of the present disclosure.

FIG. 5 shows an example of a signal flow diagram of MIMO transmission according to an embodiment of the present disclosure.

Although not shown in FIG. 5, it is assumed that the transmission antenna deciding unit 302 (see FIG. 3) of the base station 400 of FIG. 4 has decided to perform MIMO transmission of rank 2 with respect to the first terminal 410 using the antennas installed in the first and second cells among the first to third cells managed by the base station 400.

Then, a signal mapping unit 500 of the base station 400 may assign unique virtual mapping vectors 502a and 502b each having a 4×1 size to the first cell and the second cell, respectively. Then, both the first cell and the second cell may transmit four CRSs of the base station 400 to the first terminal 410. Although not shown in the drawings, a data generator of the base station 400 may generate the four CRSs, in addition to data streams that are to be transmitted to the first terminal 410. The four CRSs may pass through the virtual mapping vectors assigned to the respective cells, that is, the virtual mapping vector 502a of the first cell and the virtual mapping vector 502b of the second cell, and then be transferred to the antennas 506a and 506b of the first and second cells via RUs of the first and second cells, that is, via a RU 504a of the first cell and a RU 504b of the second cell. Data of the first terminal 410 may be generated as two data streams by the data generator, pass through the precoder 504, and then be transferred to the virtual mapping vectors 502a and 502b of the first and second cells, although not shown in the drawings. The precoder 504 may select a matrix satisfying a condition according to an embodiment of the present disclosure with respect to the virtual mapping vectors 502a and 502b. The virtual mapping vectors 502a and 502b and the precoder 504 according to an embodiment of the present disclosure will be described in more detail, later.

The CRSs passed through the virtual mapping vectors 502a and 502b may be transferred to the antennas 506a and 506b of the first and second cells through the RUs 504a and 504b of the first and second cells.

A combination of the virtual mapping vectors 502a and 502b according to an embodiment of the present disclosure may be expressed by Equation (1), below. In Equation (1), virtual mapping vectors $V_k$ corresponding to three cells managed by the base station 400 are expressed, wherein k is an indicator of each cell. That is, the first, second, and third cells of the base station 400 are mapped to virtual mapping vectors $V_1$, $V_2$, and $V_3$.

$$V_1 = \tfrac{1}{2}[j\ 1\ j\ 1]$$

$$V_2 = \tfrac{1}{2}[j\ -1\ 1\ -j]$$

$$V_3 = \tfrac{1}{2}[j\ -j\ 1\ -1] \tag{1}$$

Meanwhile, the precoder 504 may select a precoding matrix from among matrices satisfying the following condition with respect to the virtual mapping vector 502a of the first cell and the virtual mapping vector 502b of the second cell. That is, the precoding matrix satisfying the condition may be a matrix that acquires a rank value of 2 when the matrix is multiplied by a 2×4 matrix whose columns are the virtual mapping vectors $V_1$ and $V_2$ of cells (that is, the first and second cells) that are used for MIMO transmission of the terminal 410. Alternatively, the precoding matrix may be a matrix that acquires a value of zero when the matrix is multiplied by a virtual mapping matrix of the remaining cells that are not used for MIMO transmission.

For example, if virtual mapping matrices of the first to third cells of the base station 400 are selected to correspond to Equation (1), a matrix satisfying the following Equation (2) may be selected as a precoding matrix of the precoder 504.

$$\text{rank}\left\{ \tfrac{1}{2}\begin{bmatrix} j & 1 & j & 1 \\ j & -1 & 1 & -j \end{bmatrix} \cdot \tfrac{1}{2\sqrt{2}} \begin{bmatrix} 1 & 1 \\ 1 & 1 \\ -1 & 1 \\ -1 & 1 \end{bmatrix} = \tfrac{1}{2\sqrt{2}} \begin{bmatrix} 0 & 1+j \\ -1+j & 0 \end{bmatrix} \right\} = 2 \tag{2}$$

$$\tfrac{1}{2}[j\ -j\ 1\ -1] \cdot \tfrac{1}{2\sqrt{2}} \begin{bmatrix} 1 & 1 \\ 1 & 1 \\ -1 & 1 \\ -1 & 1 \end{bmatrix} = [0\ 0]$$

Also, a precoding matrix of the precoder 504 satisfying Equation (2) with respect to the virtual mapping vectors according to Equation (1) may be selected from Table (1), below. Precoding matrices and precoding matrix indexes shown in Table (1) are defined in the Long Term Evolution (LTE) standard of 3rd Generation Partnership Project (3GPP).

TABLE 1

| Group of Transmission Sectors | Precoding Matrix | Precoding Matrix Index |
|---|---|---|
| First and Second Sectors | $\tfrac{1}{2\sqrt{2}}\begin{bmatrix} 1 & 1 \\ 1 & 1 \\ -1 & 1 \\ -1 & 1 \end{bmatrix}$ | 8 |
| Second and Third Sectors | $\tfrac{1}{2\sqrt{2}}\begin{bmatrix} 1 & -1 \\ -1 & -1 \\ -1 & 1 \\ 1 & 1 \end{bmatrix}$ | 10 |
| Third and First Sectors | $\tfrac{1}{2\sqrt{2}}\begin{bmatrix} 1 & 1 \\ 1 & -1 \\ 1 & -1 \\ 1 & 1 \end{bmatrix}$ | 0 |

Meanwhile, the base station 400 may inform the terminal 410 of a precoding index corresponding to the precoding matrix used for MIMO transmission. Then, the terminal 410 may decode the data streams received through MIMO transmission according to an embodiment of the present disclosure, using the precoding matrix corresponding to the precoding index.

Equation (3) expresses another example of a combination of virtual mapping vectors according to an embodiment of the present disclosure.

$$V_1 = \tfrac{1}{2}[1\ -1\ -j\ -j]$$

$$V_2 = \tfrac{1}{2}[1+j\ 0\ 0\ -1-j]$$

$$V_3 = \tfrac{1}{2}[1\ j\ -1\ -j] \tag{3}$$

As another example, it is assumed that virtual mapping vectors corresponding to the first to third cells of the base station 400 are mapped to $V_1$, $V_2$, and $V_3$ of Equation (3). In this case, a precoding matrix of the precoder 504 satisfying Equation (2) may be selected from Table (2) below. Likewise, precoding matrices and precoding matrix indexes shown in Table (2) are also defined in the LTE standard of 3GPP.

TABLE 2

| Group of Transmission Sectors | Precoding Matrix | Precoding Matrix Index |
|---|---|---|
| First and Second Sectors | $\frac{1}{2\sqrt{2}} \begin{bmatrix} 1 & 1 \\ -j & j \\ 1 & 1 \\ -j & j \end{bmatrix}$ | 11 |
| Second and Third Sectors | $\frac{1}{2\sqrt{2}} \begin{bmatrix} 1 & 1 \\ 1 & 1 \\ 1 & -1 \\ -1 & 1 \end{bmatrix}$ | 12 |
| Third and First Sectors | $\frac{1}{2\sqrt{2}} \begin{bmatrix} 1 & 1 \\ 1 & -1 \\ 1 & -1 \\ 1 & 1 \end{bmatrix}$ | 0 |

Figure 6A:
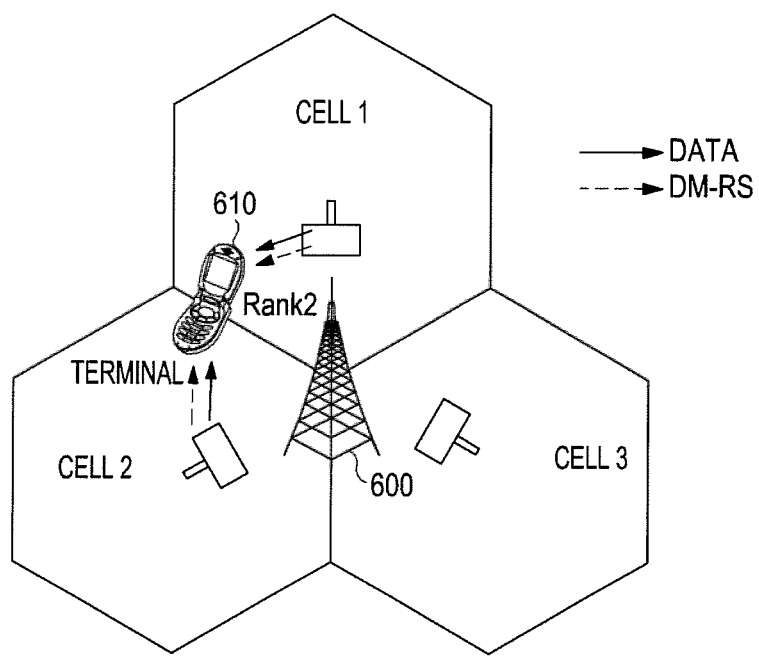
FIGS. 6A and 6B show examples of transmission systems to which MIMO transmission according to an embodiment of the present disclosure is applied.
Figure 6B:
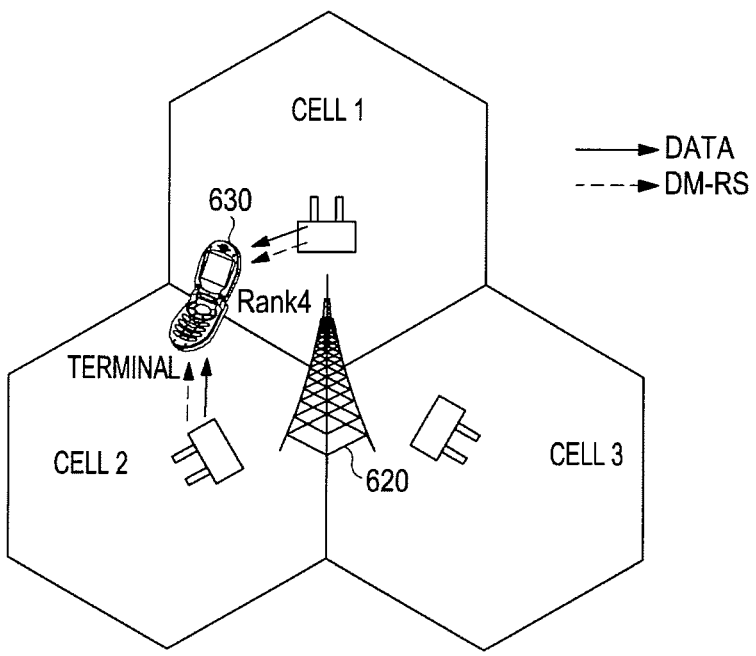

FIGS. 6A and 6B show examples of transmission systems to which MIMO transmission according to an embodiment of the present disclosure is applied. Herein, the communication systems are assumed to use 3GPP LTE Release 10 or 11. However, the MIMO transmission according to the present disclosure is not necessarily applied to LTE-based communication systems.

Referring to FIG. 6A, it is assumed that a base station 600 manages three cells, that is, first, second, and third cells, wherein each of the first, second, and third cells includes an antenna.

In this case, the base station 600 may decide to support downlink MIMO transmission of rank 2 to the terminal 610 through antennas of the first and second cells, based on measurement information of the base station 600 and measurement information received from a terminal 610. Also, it is assumed that the terminal 610 includes two antennas or more. In this case, the first cell and the second cell may transmit the same demodulation reference signal (DM-RS) to the terminal 610. At this time, the DM-RS may be multiplied by a precoding matrix selected for data transmission.

Then, the terminal 610 may receive data streams transmitted through the first cell and the second cell based on the received DM-RS, and decode the received data streams.

Referring to FIG. 6B, it is assumed that a base station 620 manages first, second, and third cells, wherein each of the first, second, and third cells includes two antennas.

In this case, the base station 620 may decide to support downlink MIMO transmission of rank 4 to a terminal 630 through two antennas of each of the first and second cells, based on measurement information of the base station 620 and measurement information received from the terminal 630. Also, it is assumed that the terminal 630 includes four antennas or more. In this case, likewise, the first cell and the second cell may transmit the same DM-RS to the terminal 630. At this time, the DM-RS may be multiplied by a precoding matrix selected for data transmission.

Then, the terminal 630 may receive data streams transmitted through the first cell and the second cell based on the received DM-RS, and decode the received data streams.

As described above, by supporting downlink MIMO transmission to a terminal using antennas of a plurality of cells according to an embodiment of the present disclosure to increase the number of data streams that are simultaneously transmitted to a terminal regardless of the number of antennas for each cell, it is possible to increase data transmission speed at cell boundary areas.

Figure 7:
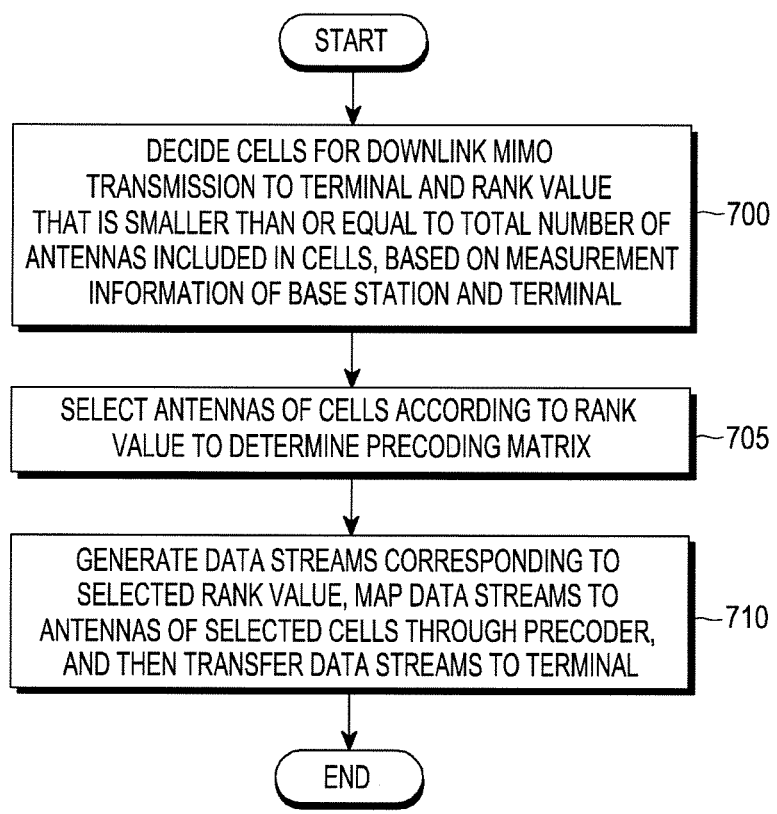
FIG. 7 is a flowchart showing operations of a base station, according to an embodiment of the present disclosure.

FIG. 7 is a flowchart showing operations of a base station, according to an embodiment of the present disclosure.

Referring to FIG. 7, a base station may decide cells for downlink MIMO transmission to a terminal and a rank value that is smaller than or equal to a total number of antennas included in the cells, based on measurement information of the base station and the terminal, in operation 700. At this time, the base station may select sectors constructing its own service coverage as the cells for MIMO transmission. Alternatively, the base station may select cells having a cell identifier that is different from its own cell identifier. Also, the measurement information of the terminal may include at least one of a maximum number of streams that can be received by the terminal, channel state information created by the terminal based on a reference signal received from the base station, an amount of data that is to be transmitted to the terminal, and QoS required by the terminal. Also, the measurement information of the base station may include information acquired by the cells receiving a sounding signal transmitted from the terminal.

Also, the base station may determine a precoding matrix according to the rank value, in operation 705. In order to determine the precoding matrix, the base station may assign unique virtual mapping vectors according to Equation (1) or Equation (3) as described above to the selected cells, respectively. Then, the base station may select a precoding matrix (that is, a precoding matrix according to Equation (2)) corresponding to a rank value calculated by multiplying the precoding matrix by a matrix whose columns are the virtual mapping vectors. Then, the base station may transmit an index of the selected precoding matrix to the terminal. In a system in which the cells transmit DM-RS, the precoding matrix can be freely selected from a group of precoding matrices without using virtual mapping vectors.

Thereafter, the base station may generate data that is to be transmitted to the terminal, as data streams corresponding to the selected rank value, map the data streams to the antennas of the selected cells through a precoder, and then transfer the data streams to the terminal, in operation 710.

Figure 8:
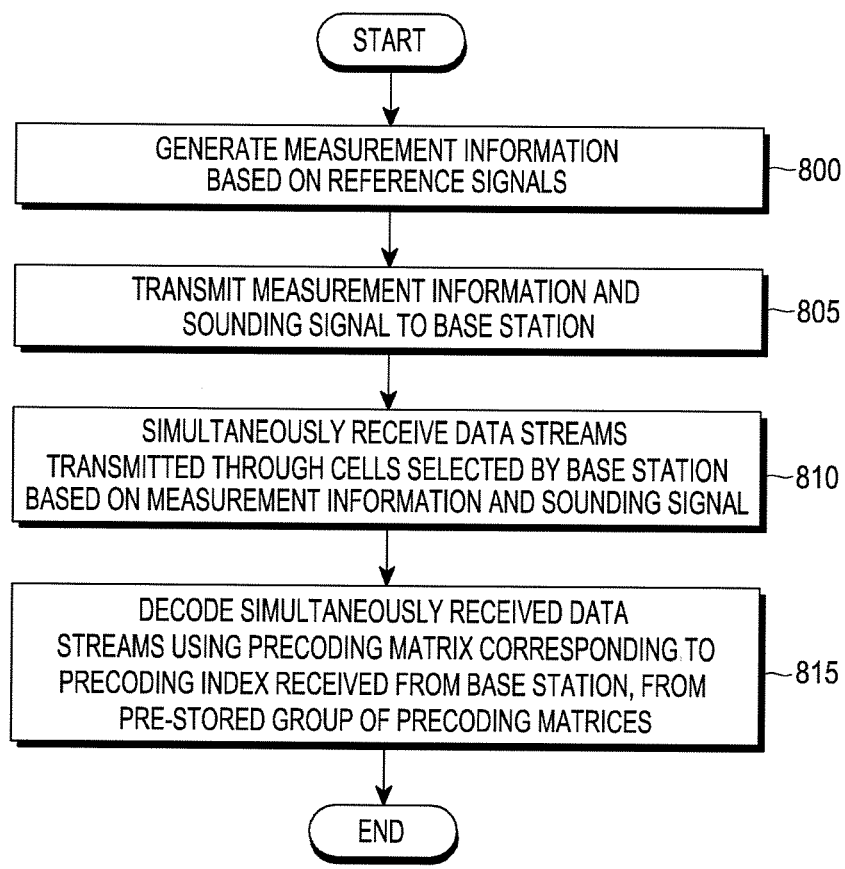
FIG. 8 is a flowchart showing operations of a terminal, according to an embodiment of the present disclosure.

FIG. 8 is a flowchart showing operations of a terminal, according to an embodiment of the present disclosure.

Referring to FIG. 8, a terminal may generate measurement information based on reference signals received from cells constructing a service coverage of a base station, in operation 800. Then, the terminal may transmit the measurement information to the base station, in operation 805. At this time, the terminal may transmit its own sound signal together with the measurement information to the base station.

The terminal may simultaneously receive data streams transmitted through cells selected by the base station based on the measurement information and the sounding signal, in operation 810. Then, the terminal may decode the simultaneously received data streams using a precoding matrix corresponding to a precoding index received from the base station, from a pre-stored group of precoding matrices, in operation 815. The precoding matrix may be a matrix that can acquire a rank value (that is, a rank value satisfying Equation (2)) selected by the base station when the precoding matrix is multiplied by a matrix whose columns are unique virtual mapping vectors assigned by the base station to the selected cells according to Equation (1) or Equation (3). In a system in which the cells transmit DM-RS, the precoding matrix may be an arbitrary matrix in a group of precoding matrices.

According to the embodiments of the present disclosure as described above, it is possible to provide MIMO transmission to a terminal regardless of the number of antennas included in cells, and to increase speed of data transmission to a terminal, Accordingly, by supporting a downlink MIMO transmission mode of a specific terminal using antennas of a plurality of cells in a multi-cell wireless communication system, it is possible to apply a downlink MIMO transmission mode regardless of the number of antennas installed in a cell, to increase the number of data streams that are simultaneously transmitted to the specific terminal, and to increase data transmission speed at cell boundary areas.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method for transmitting data by a base station in a wireless communication system, the method comprising:
   selecting a rank value and one or more cells for transmitting data based on measurement information of the base station and measurement information of a terminal;
   determining a precoding matrix based on the rank value and a first matrix including vector values assigned to the selected one or more cells;
   generating data streams based on a number of antennas in the selected one or more cells corresponding to the rank value;
   mapping the data streams to the antennas respectively based on the precoding matrix; and
   transmitting the data streams to the terminal through the antennas, wherein the precoding matrix is determined as a matrix that acquires the rank value by multiplying with the first matrix.

2. The method of claim 1, wherein selecting of the one or more cells comprises selecting the one or more cells from a plurality of cells included in a service coverage of the base station.

3. The method of claim 1, wherein the precoding matrix is determined such that a multiplication of the precoding matrix and a second matrix including vector values of non-selected cells is a zero value.

4. The method of claim 1, wherein the measurement information of the base station includes information acquired based on a sounding signal of the terminal received in each of the one or more cells.

5. The method of claim 1, wherein the rank value is smaller than or equal to a total number of antennas included in the selected one or more cells.

6. The method of claim 1, wherein the measurement information of the terminal comprises at least one of a maximum number of streams that is received by the terminal, channel state information generated by the terminal based on a reference signal received from the base station, an amount of data that is to be transmitted to the terminal, and quality of service (QoS) required by the terminal.

7. A base station in a wireless communication system, the base station comprising:
   a controller configured to:
      select a rank value and one or more cells for transmitting data based on measurement information of the base station and measurement information of a terminal;
      determine a precoding matrix based on the rank value and a first matrix including vector values assigned to the selected one or more cells;
      generate data streams based on a number of antennas in the selected one or more cells corresponding to the rank value; and
      map the data streams to the antennas respectively based on the precoding matrix; and
   a transmitter configured to transmit the data streams to the terminal through the antennas, wherein the precoding matrix is determined as a matrix that acquires the rank value by multiplying with the first matrix.

8. The base station of claim 7, wherein the controller is configured to select the one or more cells from a plurality of cells included in a service coverage of the base station.

9. The base station of claim 7, wherein the precoding matrix is determined such that a multiplication of the precoding matrix and a second matrix including vector values of non-selected cells is a zero value.

10. The base station of claim 7, wherein the measurement information of the base station includes information acquired based on a sounding signal of the terminal received in each of the one or more cells.

11. The base station of claim 7, wherein the rank value is smaller than or equal to a total number of antennas included in the selected one or more cells.

12. The base station of claim 7, wherein the measurement information of the terminal comprises at least one of a maximum number of streams that is received by the terminal, channel state information generated by the terminal based on a reference signal received from the base station, an amount of data that is to be transmitted to the terminal, and quality of service (QoS) required by the terminal.

* * * * *